(No Model.)
W. J. R. WATSON.
CYCLE WHEEL.
No. 603,160.
Patented Apr. 26, 1898.
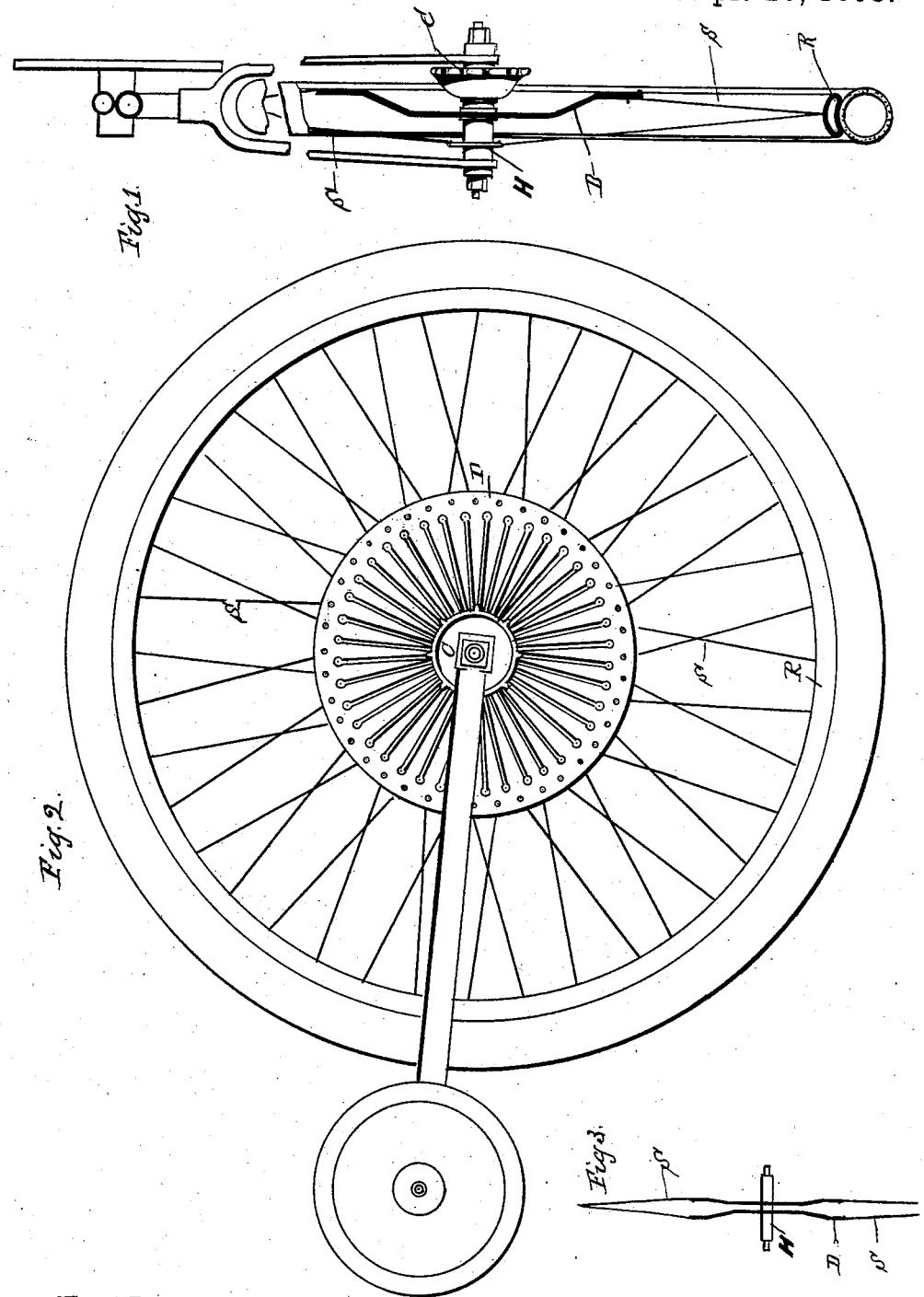
Witnesses.
William Howard
Charles William Higgs.
Inventor.
William. Joseph. Rymer. Watson

UNITED STATES PATENT OFFICE.

WILLIAM JOSEPH RYMER WATSON, OF ANTWERP, BELGIUM.

CYCLE-WHEEL.

SPECIFICATION forming part of Letters Patent No. 603,160, dated April 26, 1898.

Application filed April 2, 1897. Serial No. 630,465. (No model.) Patented in England March 4, 1897, No. 5,751.

*To all whom it may concern:*

Be it known that I, WILLIAM JOSEPH RYMER WATSON, a subject of the Queen of England, and a resident of 10 Rue de la Duchesse, Antwerp, Belgium, have invented a certain new and useful method of reducing the tread in cycles by means of an improved form of wheel, (for which I have obtained Letters Patent in Great Britain, No. 5,751, dated March 4, 1897,) of which the following is a specification.

The object of my invention is to get a narrow tread, or, in other words, a short distance between the feet of the rider.

A further object of the invention is to bring the power exerted by the rider to near the center of the wheel, by which side push is overcome and the said power is evenly divided between the pedals and therefore between the rider's feet.

A further object of the invention is to lessen the distance between the pedals of the machine and incidentally the rider's feet, that the motion of his limbs will work in a natural position as if walking, and thereby obtain the full power of the rider in a direct line of the "push," and thereby overcome the outer or side push occasioned by a hub wide between the pedals.

The invention consists in certain features of construction, as will be more fully hereinafter described, and pointed out in the claims.

As is well known the distance of the chain-wheel from the center of the driving-wheel limits the narrowness of the tread of bicycles.

In order that my invention may be more fully understood, I illustrate the same on the annexed drawings.

H is the hub of the wheel. It will be noticed that the chain sprocket-wheel C is nearer the center of the wheel than usual and may be put as much nearer to the center of the wheel as the rim R will permit, due regard being had to the clearance of the chain.

D is the dished disk, which is secured to the hub H, onto the rim of which the spokes S are fastened.

Figure 1 is a side elevation of the wheel on the chain side. Fig. 2 shows my improved wheel with a space on both sides of the hub. In this case the dished disk or frame to hold the spokes is made double and may be either in one piece or in two pieces, each secured to the hub.

The dished disk may be in the form shown in the side elevation, Fig. 1, in order to make it additionally light.

In carrying out my invention I so place and fix the spokes that they either stop short of the space occupied by the chain sprocket-wheel or they pass through a holder, so as to make space for the chain sprocket-wheel going near the center of the hub or right on the center. In the case of these spokes stopping short I adapt a new form of disk on the hub, into which the spokes are fastened on the side of the wheel where the chain sprocket-wheel goes. This disk is set back on the hub nearer to the disk on the other side than is usual, and is made of increased diameter and is dished outward after it clears the diameter of the chain-wheel. In this way the chain sprocket-wheel can be put nearer the center of the hub or right on the center.

The dished disk or equivalent frame may be fastened to the hub in any suitable way. For instance, it may be screwed on the hub up to a collar on the hub and a set-pin passed through the disk and the collar on the hub when it is up against such collar. The screw will be preferably so arranged that the pull of the driving tends to lock the parts. The disk may, if necessary, be ribbed in order to give it greater rigidity and may naturally take other forms than the precise one shown on the drawings. The spokes on the side with the new form of disk are therefore shorter than the spokes on the other side, having less distance to go before they reach the disk on the hub. Of course the angle of the short spokes may be the same as the spokes of ordinary length.

Instead of putting the sprocket-wheel directly on the hub I may put the sprocket-wheel on the disk into which the spokes are fastened, or the space for the sprocket-wheel can be obtained by making a skeleton frame to hold the spokes, which may terminate on its outer parts or be passed through holes and terminate nearer the center of the wheel, this holder thus performing an equivalent function to the dished disk hereinbefore referred to. I thus obtain a narrower tread. At the same time the driving power is more direct toward the center of the driving-wheel.

I sometimes form my sprocket-wheel so as to form the attachments to the hub out of line with the teeth. This sprocket-wheel can be employed on a bicycle in either position—that is to say, the boss part which fixes it to the hub may be on the inside or the outside, the sprocket-wheel being dished, or the teeth part of the sprocket-wheel may be carried on an attachment to the hub at or near the center of the machine and the teeth part of the sprocket-wheel fixed on the attachment as far out from the center as desired. I may make a recess on both sides of the wheel by fixing the spokes onto the disk or frame on both sides, as shown in Fig. 2. I may make the recess by a disk or disks placed on the center of the hub, with parts extending outward on each side for the spoke attachments.

It is of course obvious that driving-gear other than sprocket-wheels may be placed nearer the center of the wheel than is possible in the ordinary construction of the wheel—for instance, beveled gear.

The chain sprocket-wheel or other gear-wheel which may be put on the hub may be of any form and secured either in the usual way to the hub or secured to the disk, hub, or frame which holds the spokes.

Having now described my invention, what I claim as new, and desire to secure by Letters Patent, is—

1. The combination in a bicycle-wheel of the hub, the straight and dished disks, one arranged centrally on said hub, the spokes secured to said disk about midway between the rim and the hub, by which the strength of the wheel is maintained and the distance between the pedals is diminished for the purpose set forth.

2. The combination in a bicycle-wheel of the axle, a sleeve or bushing to fit said axle, a concave or dished disk on said sleeve, and spokes extending to the rim from said dished portion and a straight side, all arranged to bring the drive-chain near the center of the hub, substantially as set forth.

In witness whereof I have hereunto set my hand in presence of two witnesses.

WILLIAM JOSEPH RYMER WATSON.

Witnesses:
WILLIAM HOWARD,
CHARLES WILLIAM HIGGS.